May 26, 1953     W. A. STOCKDALE     2,639,837
COFFEE DISPENSER
Filed April 3, 1951                                 2 Sheets-Sheet 1
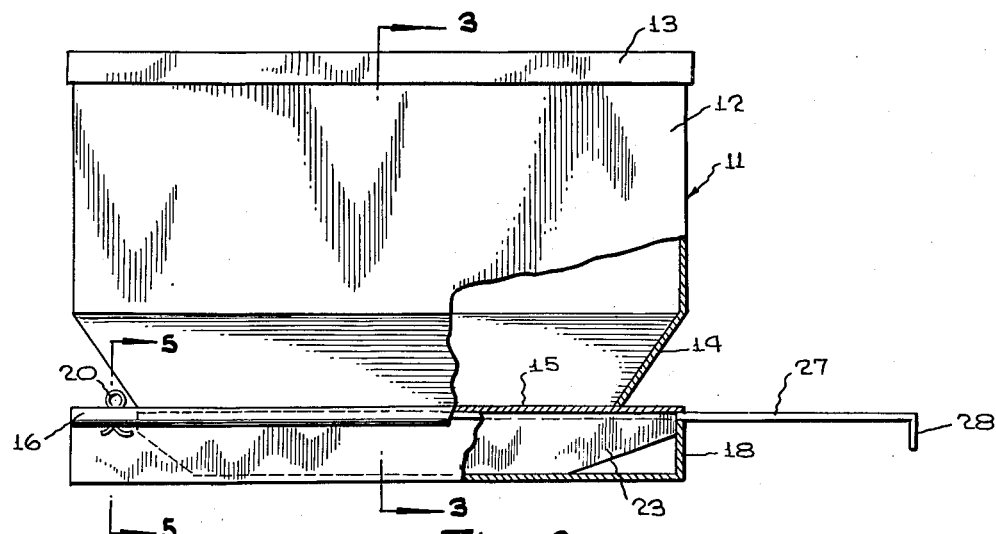
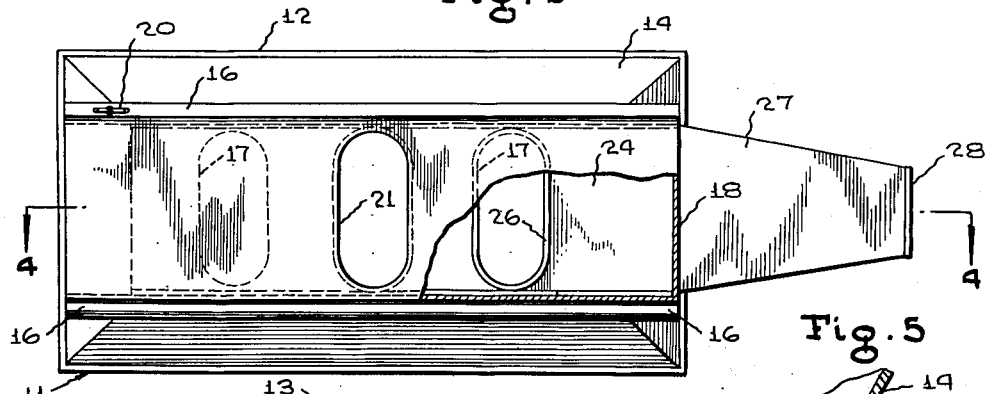
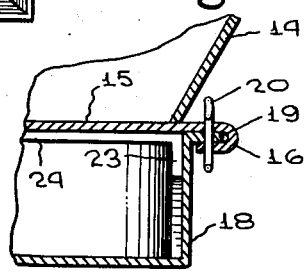
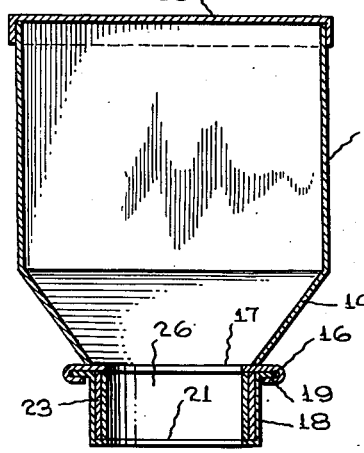
*INVENTOR.*
WILLIAM A. STOCKDALE
BY
McMorrow, Berman & Davidson
ATTORNEYS May 26, 1953

W. A. STOCKDALE 2,639,837

COFFEE DISPENSER

Filed April 3, 1951

INVENTOR.
WILLIAM A. STOCKDALE
BY
McMorrow, Berman & Davidson
ATTORNEYS

Patented May 26, 1953

2,639,837

UNITED STATES PATENT OFFICE 2,639,837

COFFEE DISPENSER

William A. Stockdale, Zanesville, Ohio

Application April 3, 1951, Serial No. 219,069

2 Claims. (Cl. 222—276)

This invention relates to dispensing devices, and more particularly to an improved coffee dispenser for use in the home to measure coffee.

A main object of the invention is to provide a novel and improved dispensing device for granular material, such as coffee or the like, said device being simple in construction, being neat in appearance, being sturdy in construction, providing accurate measurements of the amount of coffee dispensed therefrom, avoiding waste of coffee or other granular material with which the device is employed, and being easy to operate.

A further object of the invention is to provide an improved dispensing device for coffee and similar granular material which is inexpensive to manufacture, which is easily taken apart for cleaning, which requires no screws or bolts to hold it in assembled position, which need not be attached to a wall, which may be employed and stored in a cupboard or cabinet in a manner similar to which dishes are stored, which provides a saving of time in dispensing coffee and similar granular material, and which involves a minimum number of parts.

Further objects and advantages of the invention will become apparent from the folowing description and claims, and from the accompanying drawings, wherein:

Figure 1 is a side elevational view, partly in cross-section, of an improved coffee dispenser constructed in accordance with the present invention;

Figure 2 is a bottom view, partly in cross-section, of the coffee dispenser of Figure 1;

Figure 3 is a cross-sectional view taken on the line 3—3 of Figure 1;

Figure 5 is an enlarged cross-sectional detail view taken on the line 5—5 of Figure 1;

Figure 4:
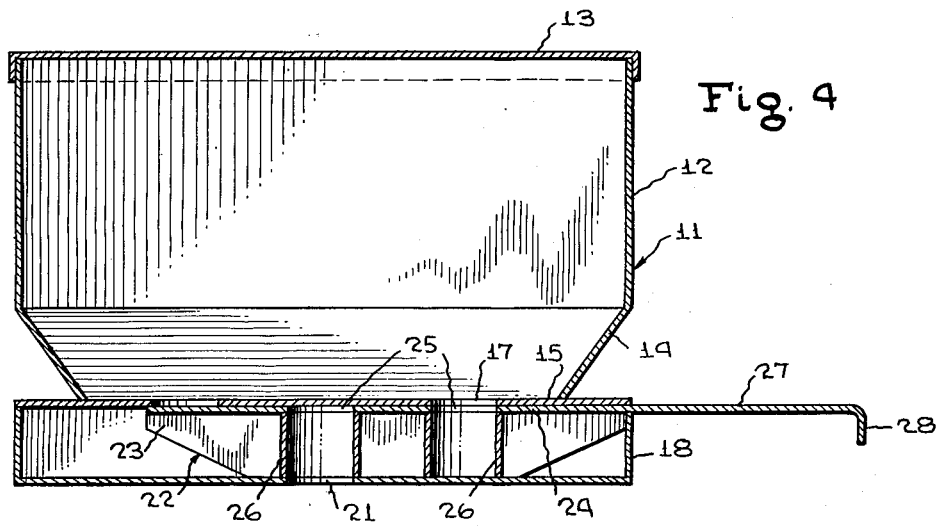
Figure 4 is a longitudinal cross-sectional view taken on the line 4—4 of Figure 2.

Referring to the drawings, the coffee dispenser is designated generally at 11 and comprises a main container 12 which is generally rectangular in shape and which is provided with the removable top cover 13. The lower portion of the container 12 tapers downwardly, as shown at 14, and has secured thereto the horizontal, rectangular bottom wall 15. The bottom wall 15 is formed at its side margins with the inturned, opposing flanges 16, 16 and is formed with the spaced, transverse, generally oval openings 17, 17. Designated at 18 is an elongated, substantially rectangular, box-like housing having the respective side marginal flanges 19, 19 received in the flanges 16, 16, and detachably secured therein by a cotter pin 20 extending through the end portion of one of the flanges 16 and the flange 19 contained therein, as shown in Figure 1, and in Figure 5. The bottom wall of the housing 18, designated at 20, is formed at its mid-portion with the transverse, generally oval, discharge opening 21 which is located midway between the metering openings 17, 17 of the bottom wall 15 of container 12.

Designated generally at 22 is a slide valve member which is slidably mounted for longitudinal movement in the box-like housing 18, said valve comprising a downwardly facing, channel-shaped member having a pair of side flanges 23, 23, and a web element 24 which is disposed closely subadjacent to the bottom wall 15 of the container 12. The web member 24 is formed with a pair of transverse, generally oval apertures 25, 25 which are longitudinally spaced apart by a distance equal to one-half the distance between the apertures 17, 17. Secured to the web element 24 around the apertures 25, 25 are the respective depending conduit members 26, 26 which are substantially equal in height to the vertical height of the interior of housing 18, whereby the bottom edges of said conduit members 26, 26 slidably engage the bottom wall of said housing. As shown in Figure 4, when one of the conduit members 26 is in registry with one of the openings 17 in the wall 15, the other conduit member 26 is in registry with the discharge opening 21 of housing 18. Such registration occurs when the end edges of the flanges 23 engage either end wall of the housing 18 in the manner shown in Figure 4, the arrangement being such that a quantity of granular material may enter the conduit member in registry with one of the apertures 17, while the other conduit member 26 is discharging through the aperture 21.

Figure 6:
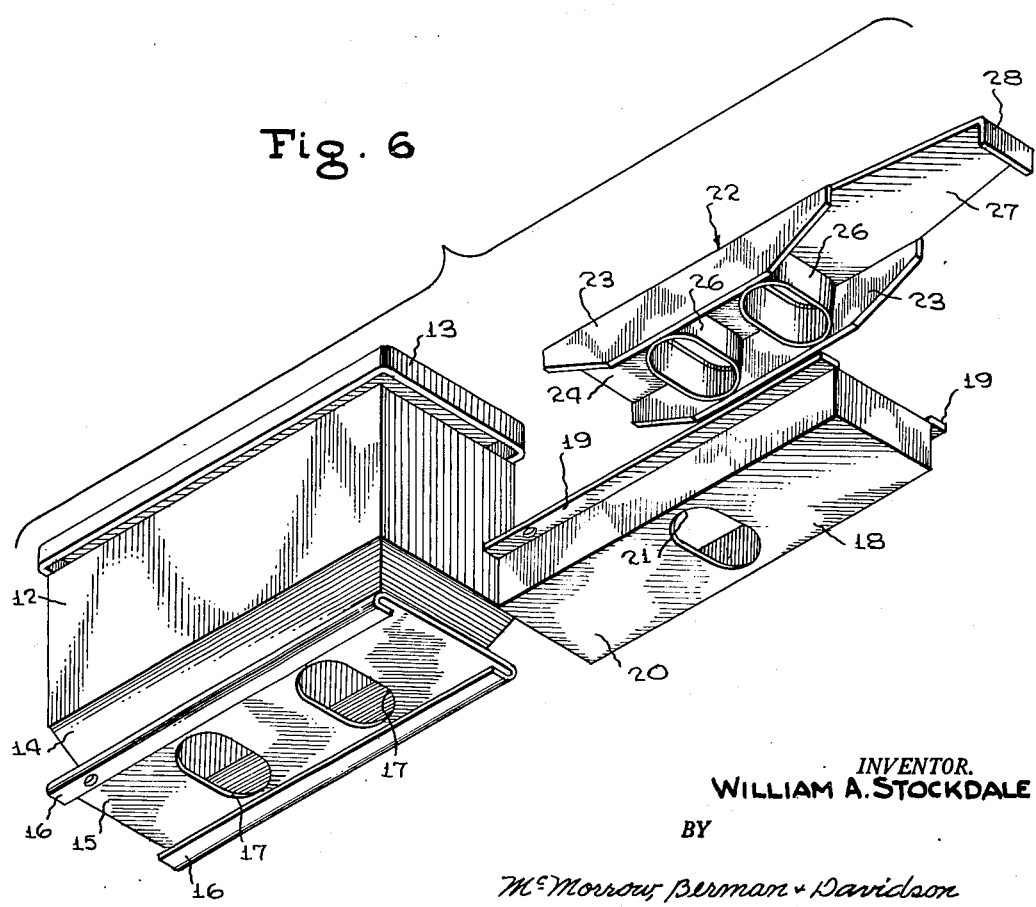
Figure 6 is a perspective view of the coffee dispenser of Figures 1 to 5, the parts of the dispenser being shown in separated positions.

Extending inwardly from the end of the web member 24 is the horizontal handle element 27, said handle element being convergent in shape, as shown in Figures 2 and 6, and being provided at its end with a depending transverse flange 28, defining a finger grip portion.

In using the device, the valve member 22 is moved back and forth in the housing 18, each stroke of the valve member providing a discharge of a measured quantity of granular material from container 12, said quantity corresponding to the volume of one of the conduit members 26. The impact of the ends of the flanges 23, 23 provide an agitating vibration which serves to loosen the granular material and to facilitate the discharge of said material from the dispenser. It will be readily apparent that the material may be rapidly and conveniently measured out from the device by merely moving the handle 27 back and forth the required number of times to dispense the required number of units of volume represented by the capacity of the conduit members 26.

When it is necessary to take the device apart for cleaning, the cotter pin 20 is removed, allowing the housing 18 to be detached from the container 12 by sliding said housing horizontally from between the flanges 16, 16, as shown in Figure 6, whereupon the valve member 22 may be readily removed from the housing 18. After the parts have been cleaned, they are reassembled to the positions thereof shown in Figures 1 to 4, and the cotter pin 20 is replaced, securing the parts in their assembled position.

The various components of the device may be manufactured from any suitable material, such as sheet metal, plastic, or other desired material having the proper mechanical characteristics. The device is employed manually and when not in use is stored in a cupboard or other storage space similar to the manner in which dishes and the like are stored.

In order to refill the dispenser, it is merely necessary to remove the top cover 13, whereupon the coffee or other granular material may be poured into the container 12 and the cover 13 replaced.

While a specific embodiment of an improved dispenser for coffee and similar granular materials has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A dispenser for granular material comprising a container having a horizontal bottom wall formed with a pair of longitudinally spaced metering openings, a horizontal rectangular housing secured to said bottom wall, the bottom of said housing comprising a flat horizontal plate extending parallel to and being substantially equal in length to said bottom wall, said plate being formed with a discharge opening located midway between said metering openings, a downwardly facing valve member having a channel-shaped transverse cross section slidably mounted on said plate for longitudinal movement in said housing, said valve member comprising side flanges disposed inwardly adjacent the longitudinal side walls of the housing, and a web disposed subadjacent the bottom wall of the container, said web being formed with a pair of apertures spaced apart by a distance equal to one-half the distance between said metering openings, respective depending conduits secured to said web around said apertures and being substantially equal in height to the vertical height of the housing, said conduits making sliding contact at their rim portions with the bottom wall of the container and with said plate, said conduits defining passages arranged so that one of said passages registers with the discharge opening when the other passage registers with a metering opening, and a longitudinally extending horizontal handle element on the end of said web extending slidably between said bottom wall and the top edge of an end wall of said housing.

2. A dispenser for granular material comprising a container having a horizontal bottom wall formed with a pair of longitudinally spaced metering openings, a horizontal rectangular housing secured to said bottom wall, the bottom of said housing comprising a flat horizontal plate extending parallel to and being substantially equal in length to said bottom wall, said plate being formed with a discharge opening located midway between said metering openings, and a downwardly facing valve member having a channel-shaped transverse cross section slidably mounted on said plate for longitudinal movement in said housing, said valve member having its side flanges disposed inwardly adjacent the longitudinal side walls of the housing and being provided with a pair of depending conduits connected to its web and being longitudinally spaced apart by a distance substantially equal to one-half the distance between said metering openings, whereby one of said conduits registers with the discharge opening when the other conduit registers with one of the metering openings, said conduits being substantially equal in vertical height to the vertical height of the housing and making sliding contact at their rim portions with the bottom wall of the container and with said plate.

WILLIAM A. STOCKDALE

References Cited in the file of this patent

UNITED STATES PATENTS

| Number | Name | Date |
|---|---|---|
| Re. 8,054 | Fawkes | Jan. 22, 1878 |
| 780,680 | Peterson et al. | Jan. 24, 1905 |
| 1,067,994 | Lundin | July 22, 1913 |
| 1,411,778 | Germain | Apr. 4, 1922 |